June 18, 1963 K. KIESEL 3,094,294
REEL STARTER FOR WINDING OF WEBS
Filed May 26, 1961
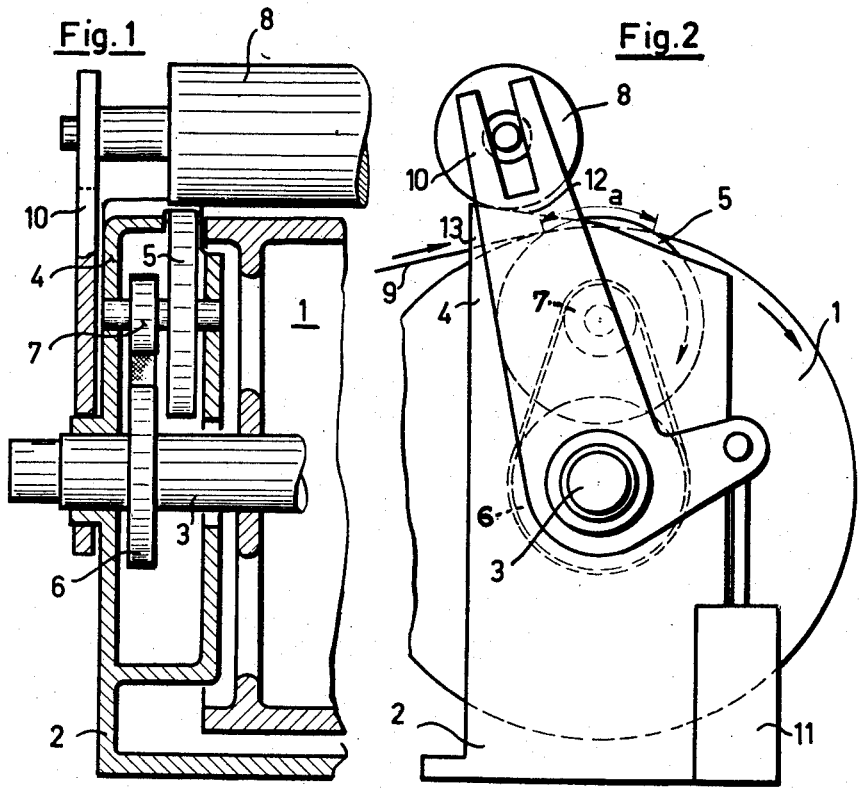
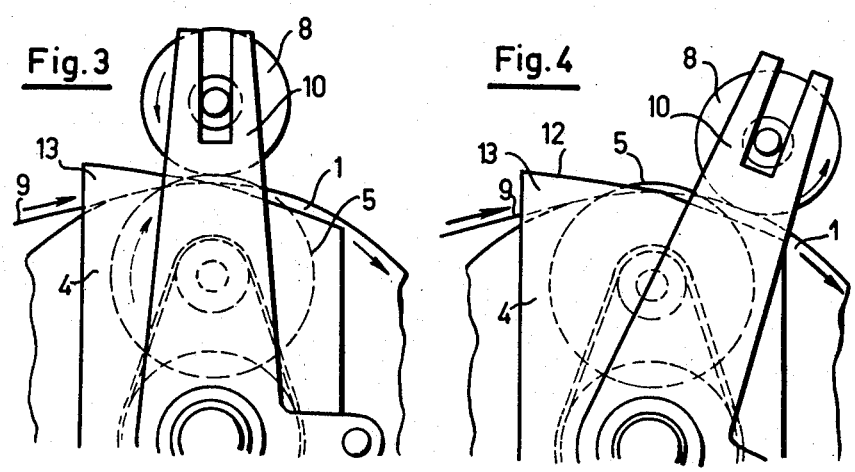
INVENTOR.
Karl Kiesel
BY
Dodge and Sun
Attorneys

United States Patent Office 3,094,294
Patented June 18, 1963

3,094,294
REEL STARTER FOR WINDING OF WEBS
Karl Kiesel, Wurttemberg, Germany, assignor to Escher Wyss G.m.b.H., Wurttemberg, Germany, a corporation of Germany
Filed May 26, 1961, Ser. No. 112,804
Claims priority, application Germany June 4, 1960
4 Claims. (Cl. 242—65)

This invention relates to an apparatus for winding paper webs or the like, having a driving drum for the winding roll and a drive derived from the driving drum for a friction disc eccentrically mounted relatively to the drum, by means of which the still empty reel core, standing in readiness during roll changing, is brought into correspondence with the speed of the web, before the reel core is set on the web.

In a known device of this kind, the friction disc is mounted on a pivotable bearing arm. The drive of the friction disc is effected via a countershaft with coupling by chains, belts or the like. For moving the bearing arm, pneumatic means are provided which also effect engagement and disengagement of the disc drive. During winding, the reel core is swung by additional means. This device is complicated. It requires two movement transmissions from the driving drum to the friction disc, namely in the first place a transmission from the spindle of the driving drum to the eccentrically situated spindle of the pivotable bearing arm, and furthermore a transmission thence to the friction disc mounted on the bearing arm. Furthermore, in starting up the reel, not only is it necessary to operate the means for the rocking thereof, but in a definite time sequence also to operate the means for moving the bearing arm carrying the friction disc, which makes attendance difficult.

In another known device, the friction disc rotates about a fixed axis and is formed in such a manner as to surround the shaft of the driving drum. For driving the friction disc, a driver is mounted on the driving drum, which driver due to the eccentric position of the centre of the friction disc relatively to the axis of the driving drum, engages the friction disc with radial play. The reel core is first brought into contact with the friction disc by a pivotable fork, likewise mounted eccentrically to the axis of the driving drum, during the pivoting of the fork from the readiness position to the operative position. In this construction, the friction disc must have the same diameter as the driving drum. It is also comparatively large. A disadvantage also consists in the fact the eccentrically mounted friction disc is driven in a non-uniform manner by the driver of the driving drum.

In the apparatus according to the invention, the aforesaid disadvantages of the known devices are avoided by the fact that the diameter of the friction disc is less than the radius of the driving drum, and that the friction disc is mouned in stationary position laterally of the driving drum and is connected with the shaft of the latter by a transmission gearing, the disc being mounted at such a height above the axis of the driving drum that it projects above the upper edge of the driving drum over a small section of its periphery.

Despite the necessity of using a transmission gearing for the drive of the friction disc, the entire drive can be accommodated in a relatively small space, and uniform rotation of the friction disc is ensured. For bringing the reel core from the readiness position to the operative position, only pivoting of the carrying fork is necessary, the reel core being brought into contact with the friction disc, without the operation of any other device, before being set on the web.

Advantageously, and as is easily possible in view of the comparatively small dimension of the friction disc, a fixed guide ledge is arranged laterally of the carrying drum in such a manner as to bring the reel core, held in a pivotable fork, on the swinging of this fork from the readiness position toward the operative position, into contact with the friction disc before being set on the web. With the provision of such a guide ledge, the spindle of the reel in the readiness position does not lie on the bottom of the fork but on the guide ledge, so that in contrast to the known devices, eccentric mounting of the pivotable fork is not necessary, so that the latter can therefore be pivotably arranged co-axially with the driving drum. With the provision of the guide ledge, there is also the advantage that reel cores of different diameters may be used without modifying the device in any way.

A constructional example of the subject of the invention is represented in simplified manner in the drawing, wherein:

FIG. 1 shows a vertical section through a part of the apparatus,

FIG. 2 shows a side view with the reel core in the readiness position, and

FIGS. 3 and 4 show side views with modified position of the reel core.

The apparatus is used for winding paper, carton, cellulose or like webs. A driving drum 1 for the winding roll is set on the shaft 3 journalled in the frame 2. A friction disc 5 is mounted in a gear housing 4 rigidly connected to the frame 2. The diameter of the friction disc 5 is less than half the diameter of the carrying drum 1. The friction disc 5 is journalled laterally of the driving drum 1 in fixed position at such a height above the axis of the driving drum that over a small section $a$ of its periphery it projects above the upper edge of the driving drum 1. The friction disc is connected to the shaft 3 by transmission gearing consisting of a belt drive with a large pulley 6 on the shaft 3 and a small pulley 7 on the spindle of the friction disc 5. The transmission ratio is selected so that the peripheral velocity of the friction disc 5 is about equal to the peripheral velocity of the driving drum 1.

The friction disc 5 with the gearing 6, 7 forms a drive derived from the carrying drum 1, by means of which a still empty reel core 8 of a winding roll, standing in readiness during roll exchange, is brought into correspondence with the speed of a paper web 9 or the like led over the driving drum 1, before said roll is set on the web.

The reel core 8 is held in a fork 10 mounted for pivoting co-axially with the driving drum 1. The pivotable fork is driven by a servo-motor 11.

In the readiness position, the fork 10 is in the position shown in FIG. 2. The empty reel core 8 held in readiness in the fork 10 then lies with its periphery on a fixed guide ledge 12 formed by a nose 13 of the gear housing 4 and projecting toward the direction of run of the web. The guide ledge 12 is so arranged as to bring the reel core 8, on the pivoting of the fork 10 from the readiness position toward the operative position, first into contact with the friction disc 5. The reel core 8 is then lifted off the guide ledge 12 (FIG. 3) and is set in rotation by the friction disc 5 at about the same peripheral velocity as the driving drum 1.

On further pivoting of the fork 10 into the operative position (FIG. 4), the reel core 8 passes beyond the projecting section $a$ of the friction disc 5 and is set on the web 9 running over the driving drum 1, so that the winding process commences. The winding roll 8 is then disposed in surface contact with the driving drum 1 so as to be driven thereby.

During pivoting of the fork 10, the reel core 8 first rests on the guide ledge 12, then on the friction disc 5 and finally on the driving drum 1 or the web 9 running over the latter, while the spindle of the winding roll is guided always with radial play in the fork 10.

Instead of the belt drive 6, 7 it is also possible to use for the drive of the friction disc 5 any other gearing with the same transmission ratio, for example a chain drive or a gearwheel mechanism.

What is claimed is:

1. An apparatus for winding webs comprising a frame for supporting a driving drum, a driving drum mounted for rotation about a horizontal axis in said frame; a friction disc having a diameter smaller than half the diameter of the driving drum mounted for rotation in a stationary position laterally of the driving drum about an axis parallel with the drum axis at a height such that a small section of its periphery projects above the upper edge of the driving drum; driving means for said friction disc connected with said driving drum so as to cause said friction disc to rotate with a peripheral velocity which is equal to the peripheral velocity of the driving drum; a winding roll in operative position disposed in surface contact with the driving drum so as to be driven thereby; and means including members mounted on the frame for initially supporting said winding roll in a readiness position out of contact with said driving drum and for passing said winding roll from said readiness position past said projecting section of the friction disc to said operative position so that the winding roll is set in rotation by the friction disc at the same peripheral velocity as the driving drum before it reaches its operative position.

2. The apparatus defined in claim 1 in which the means for supporting said winding roll comprise a fork pivotally mounted on said frame in which the winding roll is held when being supported in its readiness position and passed to its operative position; and a fixed guide ledge arranged laterally of the driving drum in such a manner as to bring the winding roll, on the pivoting of said fork from the readiness position toward the operative position, into contact with the friction disc.

3. The apparatus defined in claim 2 in which the fork is mounted so as to pivot coaxially with the driving drum.

4. The apparatus defined in claim 2 in which the frame comprises a gear housing, in which the friction disc is mounted, said gear housing being provided with an upwardly projecting nose forming said fixed guide ledge and being arranged so as to guide the winding roll inserted into said fork, on the pivoting of the fork, from its readiness position onto said friction disc.

References Cited in the file of this patent

UNITED STATES PATENTS

| | | |
|---|---|---|
| 2,475,480 | Clem et al. | July 5, 1949 |
| 2,935,272 | Schmitz | May 3, 1960 |